United States Patent

Oyanagi et al.

[11] Patent Number: 6,066,380
[45] Date of Patent: May 23, 2000

[54] DISC MEDIUM SUBSTRATE AND DISC DEVICE

[75] Inventors: Eiki Oyanagi; Takeshi Sasa; Yasuyuki Imai; Hiroshi Takino, all of Miyagi; Teiji Kohara, Kanagawa; Masayoshi Oshima, Saitama, all of Japan

[73] Assignees: Sony Corporation; Nippon Zeon Co., Ltd., both of Tokyo, Japan

[21] Appl. No.: 09/051,938

[22] PCT Filed: Aug. 22, 1997

[86] PCT No.: PCT/JP97/02927

§ 371 Date: Oct. 13, 1998

§ 102(e) Date: Oct. 13, 1998

[87] PCT Pub. No.: WO98/08217

PCT Pub. Date: Feb. 26, 1998

[30] Foreign Application Priority Data

Aug. 23, 1996 [JP] Japan .................................. 8-222703

[51] Int. Cl.$^7$ ...................................................... B32B 3/00
[52] U.S. Cl. ........................ 428/64.1; 428/64.2; 428/64.4; 428/65.3; 428/913; 430/270.11; 430/945.1; 369/275.1; 369/283; 264/478
[58] Field of Search ................................. 428/64.1, 64.2, 428/64.3, 64.4, 913, 65.3, 694 TR; 430/270.11, 945.1; 369/275.1, 283, 288; 264/478

[56] References Cited

U.S. PATENT DOCUMENTS

| | | | |
|---|---|---|---|
| 5,202,810 | 4/1993 | Nakamura et al. | 360/135 |
| 5,328,740 | 7/1994 | Nakayama et al. | 428/64.1 |
| 5,334,424 | 8/1994 | Hani et al. | 428/141 |
| 5,354,595 | 10/1994 | Yamamoto et al. | 428/147 |
| 5,585,989 | 12/1996 | Kuromiya et al. | |

FOREIGN PATENT DOCUMENTS

| | | |
|---|---|---|
| 62-119008 | 5/1987 | Japan . |
| 7-153069 | 6/1995 | Japan . |

*Primary Examiner*—Elizabeth Evans
*Attorney, Agent, or Firm*—Hill & Simpson

[57] ABSTRACT

A molded thermoplastic resin disc substrate specially adapted for use with floating head type recording/reproduction apparatus is provided. The molded disc substrate has surface smoothness characteristics which are the same or better than are provided with mirror polished aluminum discs. The molded disc substrates include a floating head scanning surface wherein the maximum projection height or maximum surface irregularity is less than about 50 nm to reduce or eliminate damage to either the disc or floating head caused by unwanted collisions between them. In a preferred embodiment, the molded disc substrates are molded from a thermoplastic resin composition containing 10000 particles/gram or less of particles having a particle diameter of 0.5 $\mu$m or more. In a preferred embodiment, control of particle size and content is achieved by subjecting the resin molding composition to a sequence of filtering steps using filters of decreasing mesh size.

14 Claims, 5 Drawing Sheets

DISC MEDIUM SUBSTRATE AND DISC DEVICE

TECHNICAL FIELD

This invention relates to a substrate for disc medium molded by, e.g., injection molding having excellent surface smoothness and a method of manufacturing the same.

Further, this invention relates to a disc apparatus specially adapted for use in recording/reproduction operations employing a floating head.

BACKGROUND ART

In the recording/reproducing system for recording/reproducing digital information with respect to recording medium, e.g., magnetic disc by the magnetic head, the magnetic disc is rotated at a high speed at the time of operation, whereby recording/reproduction operation is carried out in the state where a floating slider (floating head) including the magnetic head mounted thereat is caused to slightly float spaced above the magnetic disc surface.

In this case, in the floating head caused to float, the floating distance must be reduced to below a maximum limit in order to suppress spacing losses. In the case of the floating head of small floating quantity type, the floating quantity is set to about 50 nm. When projections higher than this floating quantity exist on the magnetic disc surface, the magnetic head collides with the projections, resulting in breakage of the magnetic disc or the magnetic head.

Therefore, in aluminum substrates which are widely used as the magnetic disc substrate, turning (lathe) machining or pressure annealing is implemented to carry out finishing off undulations or uneveness of the principal surface so as to remove 20 $\mu$m or less. Thereafter, a coating by electroless deposition (plating) layer of Ni—P alloy is performed so that its thickness is equal to about 30 $\mu$m to provide necessary hardness to the surface. The hardened surface is thereafter subjected to a grinding operation so that the average surface roughness is equal to about 0.02 $\mu$m and thickness is equal to about 15 $\mu$m, whereby mirror finish is provided.

However, such processing method has the problem that productivity is remarkably inferior (poor), so not only there results increased manufacturing cost, but also it is impossible to provide in advance uneven portions at the portion where servo mark is to be formed in correspondence with, e.g., realization of high recording density.

It is also well known to mold optical disc substrates. In the case where plastic material is used, both disc substrate having no uneven portion and disc substrate on which uneven portions are formed can be easily molded by selection of metal mold or stamper at the time of injection molding.

As the magnetic disc substrate of resin a, substrate using thermoplastic norbornene resin is disclosed in the Japanese Patent Application Laid Open No. 153060/1995 publication. When plastic material used for the magnetic disc substrate is, e.g., polycarbonate or polymethyl methacrylate, etc. as used in the optical disc substrate, deformation by moisture absorption is large. For this reason, it cannot be necessarily said that such material is suitable. In addition, in the case of polymethyl pentene or polystyrene, etc. even if that material is plastic material of low moisture absorption, the substrate is deformed after molding by crystallinity defects or the heat-resistance may be insufficient. This is not preferable.

On the contrary, in the case of the magnetic disc substrate using thermoplastic norbornene resin, deformation by moisture absorption or crystallinity hardly takes place, and heat resistance is also sufficient.

However, as the result of studies by inventors of this invention, even in the case of the magnetic disc substrate of resin using this thermoplastic norbornene resin, although surface roughness of metal mold or stamper used in the injection molding is controlled so that it is in correspondence with the same degree as that of the magnetic disc substrate of aluminum, it has been found that projections higher than floating quantity of the magnetic head is unforeseenly formed on the surface.

In the magnetic disc using magnetic disc substrate having such projections, particularly in the case where floating quantity of the floating head is reduced to the limit, reliability is damaged to much degree.

DISCLOSURE OF THE INVENTION

An object of this invention is to provide a substrate for disc medium in which there is no collision of the floating head and capable of carrying out high reliability recording/reproduction.

Further, an object of this invention is to provide a method of manufacturing a substrate for disc medium in which projections higher than floating quantity of the floating head are not formed on the surface.

As the result of the fact that inventors of this invention have energetically carried out studies in order to attain the above-described objects, they have found that the number of foreign particles (materials) having specific particle diameter or more in substrate molded body for disc medium of resin is controlled so that it is equal to specific numeric value or less to thereby facilitate substrate for disc medium having no projection on the surface to be obtained, thus to complete this invention.

Namely, the substrate for disc medium of this invention is characterized in that, in a substrate for disc medium of resin used in a disc medium adapted so that recording and/or reproduction are carried out by the floating head, projection having height of 50 nm or more are not formed at least on the surface where the floating head scans.

When projections having 50 nm or more exist on the surface where the floating head scans of the substrate for disc medium, the floating head collides with such projections to damage the floating head or the disc medium.

On the contrary, if projection having height of 50 nm or more does not exist, there is no possibility that such a collision takes place. Thus, high reliability recording/reproduction can be made.

At the portion immediately below the projection as described above, foreign particle (material) 2 is observed in substrate 1 for disc medium. It has been found that projection having height H corresponding to its particle diameter (size) D takes place by foreign particle 2 included in this substrate 1 for disc medium.

Accordingly, in order to manufacture substrate for disc medium where projection as previously described does not exist, it is sufficient to conduct a control such that, e.g., the number of foreign particles having particle diameter of 0.5 $\mu$m or more mixed into the molded body is 10000/g or less, preferably 7000/g or less, more preferably 5000/g or less.

Moreover, as a method of controlling the number of foreign particles in molded body, there is mentioned, e.g., a method in which resin having lesser number of foreign particles is used and molding is carried out under the environment having high degree of cleanness.

Since the substrate for disc medium of this invention does not have projections having height of 50 nm or more on the surface, it is possible to suppress collision of the floating head. Accordingly, it is possible to prevent damage of the floating head or the disc itself. Thus, disc prepared by using such substrate, e.g., magnetic disc is permitted to have performance and/or reliability at the time of recording/ reproduction equivalent to those of disc using aluminum substrate.

Further, in the substrate for disc medium of this invention, uneven portions such as the portion where servo mark is to be formed and/or the portion where data area is to be formed, etc. can be formed with good positional accuracy by, e.g., injection molding, etc. Therefore, e.g., magnetic disc substrates of high recording density can be manufactured with good productivity. Thus, industrial value is extremely great.

BEST MODE FOR CARRYING OUT THE INVENTION

A substrate for disc medium, e.g., magnetic disc substrate of this invention is directed to a substrate of resin characterized in that it does not have projections of height of 50 nm or more.

Studies will be conducted in connection with the case where recording/reproduction are carried out by the floating head with respect to, e.g., mirror substrate having double layer film of CoPtCr on the surface.

Figure 1:
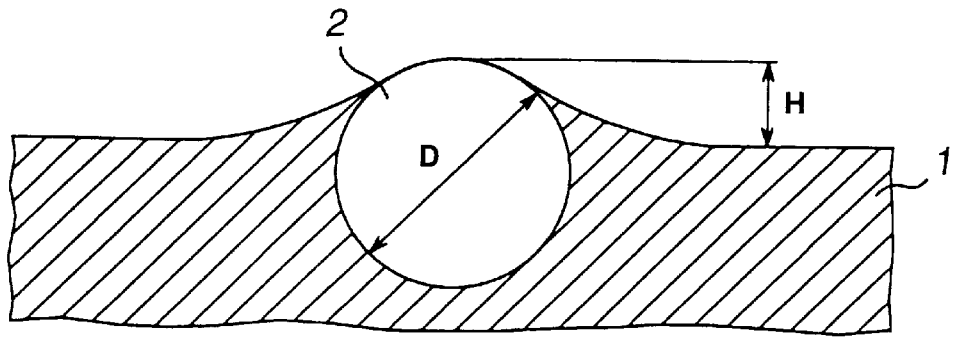
FIG. 1 is a model view showing the state where projection is formed by foreign particle.
Figure 2:
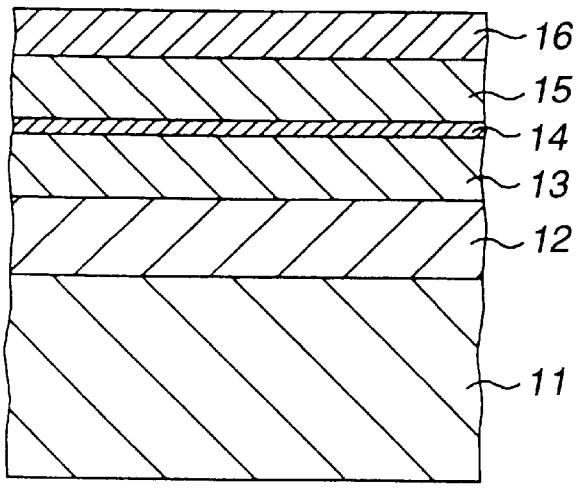
FIG. 2 is an essential part schematic cross sectional view showing the configuration of magnetic disc used for study.

The structure of the magnetic disc used is as shown in FIG. 2. On a magnetic disc substrate 11, there are formed in succession a Cr underlying layer 12, a CoPtCr layer 13, a Cr intermediate layer 14, a CoPtCr layer 15, and a carbon protective film 16. Total thickness of these layer portions is 100 nm or less, and the magnetic characteristic of the CoPtCr layer is Hc=167 kA/m (2100 Oe), Mr·δ=9.2 mA (116G μm), S=0.78, S*=0.80 and Ms=522 kA/m (6600G).

As the recording head, there is used induced type head having gap length of 0.6 μm and track width of 3.5 μm. As the reproduction head, there is used MR head having gap length of 0.36 μm and track width of 2.5 μm. Recording/ reproduction operation was carried out under the condition of the head floating quantity of 70 nm.

Figure 3:
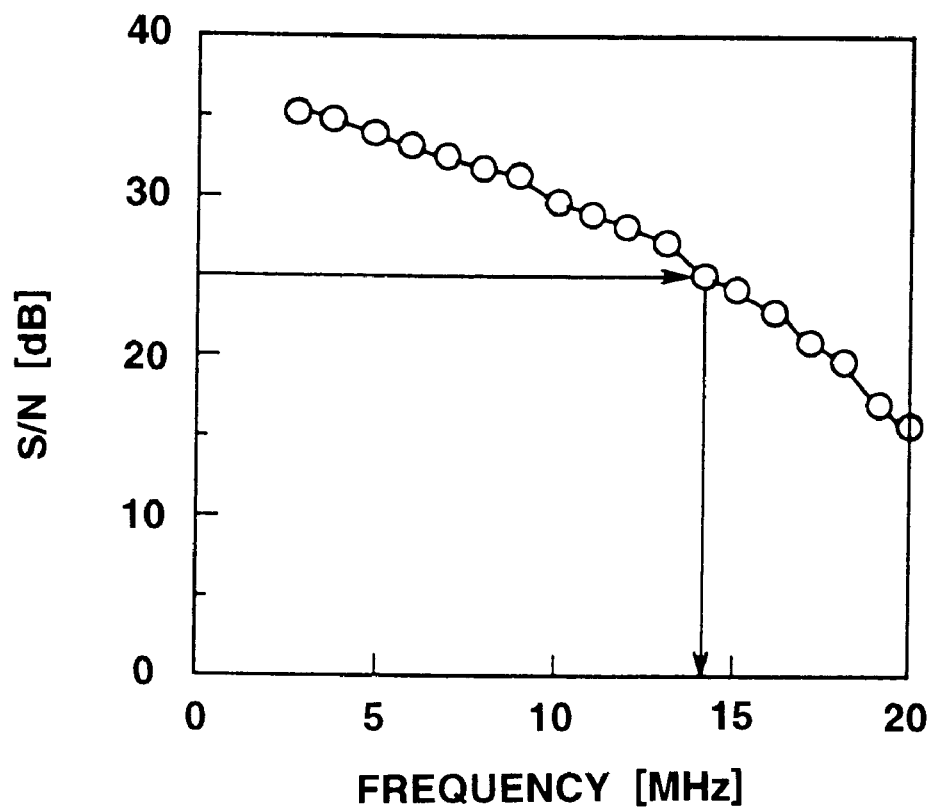
FIG. 3 is a characteristic diagram showing frequency characteristic of S/N in floating quantity of 70 nm.

As a result, as shown in FIG. 3, 25 dB was obtained as S/N of signal having frequency of 14 MHz at circumferential speed of 7 m/sec. This S/N 25 dB is a sufficient value even if the amplifier system of the system and the error correction, etc. are taken into consideration.

On the other hand, about 30% of the floating quantity is change quantity by processing variations (unevenness) of the slider, weight variations, variations of height at the drive unit, warp of the substrate, change at the time of seek, and/or change in pressure, etc.

With respect to the floating quantity of 70 nm, 30%, i.e., 20 nm is change quantity and the remaining quantity is 50 nm. Accordingly, when there exists projection of 50 nm or more on the magnetic disc substrate, there is the possibility that the floating head may be crushed. To the contrary, if projection having height of 50 nm or more does not exist, such crush hardly takes place.

As resin material used for molding of the above-described substrate for disc medium of resin, thermoplastic resin excellent in the heat resistance, the precision moldability and the low moisture absorption deformation characteristic, etc. is preferable.

More particularly, there is preferable amorphous thermoplastic resin in which glass transition temperature is 100° C. or more, preferably 120° C. or more from a viewpoint of the heat resistance, the glass transition temperature is 300° C. or less, preferably 250° C. or less in the amorphous resin from a viewpoint of the precision moldability, and water absorption ratio (after immersed for 24 hours at 25° C.) is 0.2 % or less, preferably 0.1% or less from a viewpoint of the low moisture absorption characteristic.

In more practical sense, there are enumerated, e.g., polystyrene resin; polycarbonate resin, e.g., poly (oxy carbonyl-1,4-phenylene isopropylidene-1,4-phenylene); polyarylate resin, e.g., poly((oxy-telephtaroyl oxy-1,4-phenylene isopropylidene-1,4-phenylene) ⊐(copolymer) (oxy-isophthaloyl oxy-1,4-phenylene isopropylidene-1,4-phenylene)), terephthalic acid.isophthalic acid.bis phenol A condensed polymerized compound, etc; polysulfonic resin, e.g., poly (oxy-1,4-phenylene sulfonyl-1,4-phenylene oxy-1,4 phenylene isopropylidene-1,4-phenylene); polyether sulfonic resin, e.g., poly (oxy-1,4-phenylene sulfonyl-1,4-phenylene); polyether imide resin, e.g., 4,4'-[isopropylidene bis (p-phenylene oxy)] diphthalic acid dianhydride.m-phenylene diamine condensed polymerized compound; cyclodiene system resin, e.g., hydrogenized cyclopentadiene polymer or hydrogenized cyclohexadiene polymer, etc. disclosed in the Japanese Patent Application Laid Open No. 136057/1994 publication or the Japanese Patent Application Laid Open No. 258362/1995, etc; thermoplastic norbornene resin. Thermoplastic norbornene resin is e.g., ring opening polymer of norbornene monomer, hydrogenated ring opening polymer of norbornene monomer, addition polymer of norbornene monomer, addition copolymer of norbornene monomer and olefin disclosed in the Japanese Patent Application Laid Open No. 80400/1976 publication, the Japanese Patent Application Laid Open No. 26024/1985 publication, the Japanese Patent Application Laid Open No. 168725/ 1989 publication, the Japanese Patent Application Laid Open No. 190726/1989 publication, the Japanese Patent Application Laid Open No. 14882/1991, the Japanese patent Application Laid Open No. 122137/1991 publication, and the Japanese Patent Application Laid Open No. 63807/1992 publication, etc. Especially, thermoplastic norbornene resin is preferred in which the heat resistance, the precision moldability and the low moisture absorption characteristic, etc. are well balanced.

As monomer for obtaining the thermoplastic norbornene resin, monomer well known in the above-mentioned publications, the Japanese Patent Application Laid Open No. 27424/1990 publication, and the Japanese Patent Application Laid Open No. 276842/1990 publication, etc. may be used. For example, there are norbornene, alkyl derivatives thereof, alkylidene, alkenyl, aromatic substituted derivative and halogen of substituted or non-substituted olefin thereof, and polar group substituted material of hydroxyl group, ester group, alkoxy group, cyano group, amide group, imide group, silyl group, etc. As actual example, there are recited 2-norbornene, 5-methyl-2-norbornene, 5,5-dimethyl-2-norbornene, 5-ethyl-2-norbornene, 5-butyl-2-norbornene, 5-hexyl-2-norbornene, 5-octyl-2-norbornene, 5-octadecyl-2-norbornene, 5-ethylidene-2-norbornene, 5-isopropenyl-2-norbornene, 5-methoxycarbonyl-2-norbornene, 5-cyano-2-norbornene, 5-methyl-5-methoxycarbonyl-2-norbornene, 5-phenyl-2-norbornene, 5-phenyl -5-methyl-norbornene, etc.

Moreover, monomer in which one cyclopentadiene or more are added to norbornene, and derivative or substituted material similar to the above may be used. As an actual example, there are enumerated 1,4:5,8-dimethano-1,4: 4a,5, 6,7,8,8a-octahydronaphthalene, 6-methyl-1,4: 5,8-dimethano-1,4,4a,5,6,7,8,8a-octahydonaphthalene, 6-ethyl-1,4:5,8-dimethano-1,4,4a,5,6,7,8,8a -octahydronaphthalene, 6-ethylidene-1,4: 5,8-dimethano-1,4,4a,5,6,7,8,8a-octahydronaphthalene, 6-methyl-6-methoxycarbonyl-1,4:5, 8-dimethano-1,4,4a,5,6,7,8,8a-octahydronaphthalene, 6-cyano-1,4:5,8-dimethano-1,4,4a,5,6,7,8,8a -octahydronaphthalene, etc.

Further, monomer of polycyclic structure which is polymer of cyclopentadiene and derivative or substituted material similar to the above may be used. As an actual example, there are enumerated dicyclopentadiene, 1,4:5,8-dimethano-1,2,3,4,4,5,6,7,8,8a-2,3-cyclopenta dienonaphtalene, 1,4:5, 10:6,9-trimethano -1,2,3,4,4a,5,5a,6,9,9a,10,10a-dodeca hydro-2,3,-cycopentadiene-anthracene, 2,3,-dihydrodicyclopentadiene, etc.

Further, cyclopentadiene and tetrahydroindene, indene, benzo-furan, etc. and addition material (product) thereof, and derivative or substituted material similar to the above may be used. As an actual example, there are enumerated 1,4-methano-1,4,4a,4b,5,8,8a,9a-octahydro -fluorene, 5,8-methano-1,2,3,4,4a,5,8,8a-octahydro-2, 3-cyclopentadienonaphthalene, 1,4-methano-1,4,4a,9a, -tetrahydrofluorene, 1,4-methano-1,4,4a,9a -tetrahydrodibenzofuran, etc.

The thermoplastic norbornene resin used in this invention includes at least one kind of monomer or more selected from the above-mentioned monomers, and may include monomer which doses not substantially injure the characteristic such as solubility of target polymer, etc., and which are copolymerizable therewith in addition to the above-mentioned monomers within the range subject to improvement. As copolymerizable monomer, there is enumerated cycloolefin such as cyclopentene, cyclohexene, cycloheptene, or cyclooctene, etc.

Further, in the case where the thermoplastic norbornene resin is an addition copolymer of a norbornene monomer and an olefin, any α-olefin such as ethylene, propylene, 1-butene, 1-hexylene, 4-methyl-1-pentene, styrene, etc. maybe used as the olefin.

Limit viscosity [η] measured in decalin or toluene at 25° C. of these thermoplastic norbornene resins is about 0.01 to about 20 dl/g, preferably about 0.05 to about 10 dl/g, and more preferably 0.1 to 5 dl/g. When the limit viscosity is too small, dimensional shape stability is not maintained. If the limit viscosity is too large, moldability becomes poor.

Moreover, glass transition temperature (hereinafter abbreviated as Tg) of these thermoplastic norbornene resins is about 50° C. to about 200° C., preferably 70° C. to 180° C., and more preferably 80° C. to 160° C.

It is to be noted that various kinds of additives, e.g., antioxidants such as phenol system or phosphoric system, etc., ultraviolet absorbing agent such as benzophenone system etc., light resistant stabilizer, anti-static agent, and lubricant agent such as ester of fatty alcohol, partial ester or partial ether of polyatomic alcohol, etc. may be added into the above-mentioned thermoplastic norbornene resins as required. Moreover, other resin or rubber polymer, etc. may be used in mixed state within the range where the objects of this invention are not injured.

Material in which the number of foreign particles having particle diameter of 0.5 $\mu$m or more in the thermoplastic norbornene resin preferably used in this invention has been reduced is disclosed in, e.g., the Japanese Patent Application Laid Open No. 57615/1991 publication. The number of foreign particles having particle diameter of 0.5 $\mu$m or more in the pellet is about $6\times10^4$/g at the minimum. This value is insufficient for removing projection on the magnetic disc substrate.

In order to manufacture resin pellets having the particle diameter of 0.5 $\mu$m or more and the number of foreign particles of 10000/g or less used in this invention, such manufacturing can be carried out by a method of filtering, at multi-stage, e.g., solution in which synthesized resin is dissolved into solvent by using filter having small aperture of about 0.2 $\mu$m in succession from the filter having large aperture of about 1 to 5 $\mu$m, or to filtrate such solution by filter having adsorption ability by $\zeta$ (zeta)-potential in a manner combined therewith or by itself thereafter to heat the resin solution, under decompressed state, by the closed system so that any foreign material is not mixed from the external environment to carry out removal of the lubricant component to conduct cooling/realization of pellet under the environment of high degree of cleanness, e.g., within clean room, etc. (the environment where management is rigorously carried out such that degree of cleanness is class about 1000 or less, preferably class about 100 or less) or the like.

In the case of injection-molding the magnetic disc substrate by using the resin pellet in which the number of foreign particles has been controlled, such an approach is employed also in this case to carry out injection molding under the environment of high degree of cleanness, e.g., within the clean room, etc. (environment where management is rigorously carried out such that the degree of cleanness is class about 1000 or less, preferably class about 100 or less), thereby making it possible to maintain the number of foreign particles in the resin molded body so that it is in correspondence with similar number of foreign particles in the resin for molding.

The substrate for disc medium of resin according to this invention is molded by injection molding so that the area of the slider movement range becomes smooth or uneven. In the case where the area of the slider movement range is smooth, an approach is employed to write servo mark by servo writer in order to allow the floating head to follow the recording tracks or to give address information. Moreover, in the case where uneven portions are provided within the slider movement range so that the portions where recording tracks are to be formed become convex and the portions where the guard bands are to be formed become concave, such approach is advantageous in realization of high recording density by narrowing of the recording track width. In this case, depth of concave portion surface with respect to the convex portion surface is ordinarily 0.05 to 0.3 $\mu$m.

For injection molding of smooth substrate for disc medium, there is used smooth stamper, etc. prepared by mirror finished smooth metal mold or electroless plating. The surface roughness of such smooth surface is ordinarily 2.0 nm or less, preferably 1.0 nm or less in terms of center line average roughness Ra value.

For injection molding of the substrate for disc medium having uneven portions, there is used stamper, etc. where uneven portions are formed by the mastering technology used in the servo mark formation of stamper for magneto-optical disc, etc. Each of the surface roughness of only the convex portion surface and the concave portion surface is ordinarily 2.0 nm or less, preferably 1.0 nm or less in terms of the center line average roughness Ra value.

The disc medium, e.g., the magnetic disc is of a structure in which at least magnetic layer is formed on a substrate for disc medium as previously described.

Further, it is preferable that this magnetic disc is adapted so that magnetic layer is uniformly formed over the entirety of the slider movement range of the magnetic disc substrate. Moreover, in the case of magnetic disc substrate having uneven portions, it is preferable that magnetization direction at the concave portion and magnetization direction at the convex portion are opposite to each other. Thus, the magnetization inverting portion where leakage magnetic flux is produced is determined by the boundary between the concave portion and the convex portion of the magnetic disc substrate, and such uneven portions are formed with good accuracy by injection molding of resin. Accordingly, positional accuracy of servo mark becomes excellent.

It is to be noted that underlying layer, protective layer and lubricant coated layer, etc. may be provided on the magnetic disc substrate. The materials constituting the underlying layer, the magnetic layer, the protective layer and the lubricant coating layer and the methods of forming those layers may be any one of conventionally well known materials and methods. Although particularly not limited, e.g., the method of forming the underlying layer by Cr, Mo, etc., the method of forming the magnetic layer by metallic magnetic thin film such as CoPt, CoPd, CoCrPt, etc., the method of forming the protective layer by sputtering method, etc. using C, $SiO_2$, etc. are representative. In addition, the lubricant coated layer may be formed by coating lubricant, e.g., perfluoropolyether (trade name: Fomblin Z-DOL, etc.) by the spin coat method, etc.

The magnetic disc is assembled into the magnetic disc unit. Thus, recording/reproduction operation is carried out. In this case, the magnetic disc unit comprises, e.g., magnetic disc, head slider adapted so that at least a portion thereof is caused to float at the time of recording/reproduction, and magnetic head mounted at the head slider to carry out recording/reproduction with respect to the magnetic disc.

Figure 4:
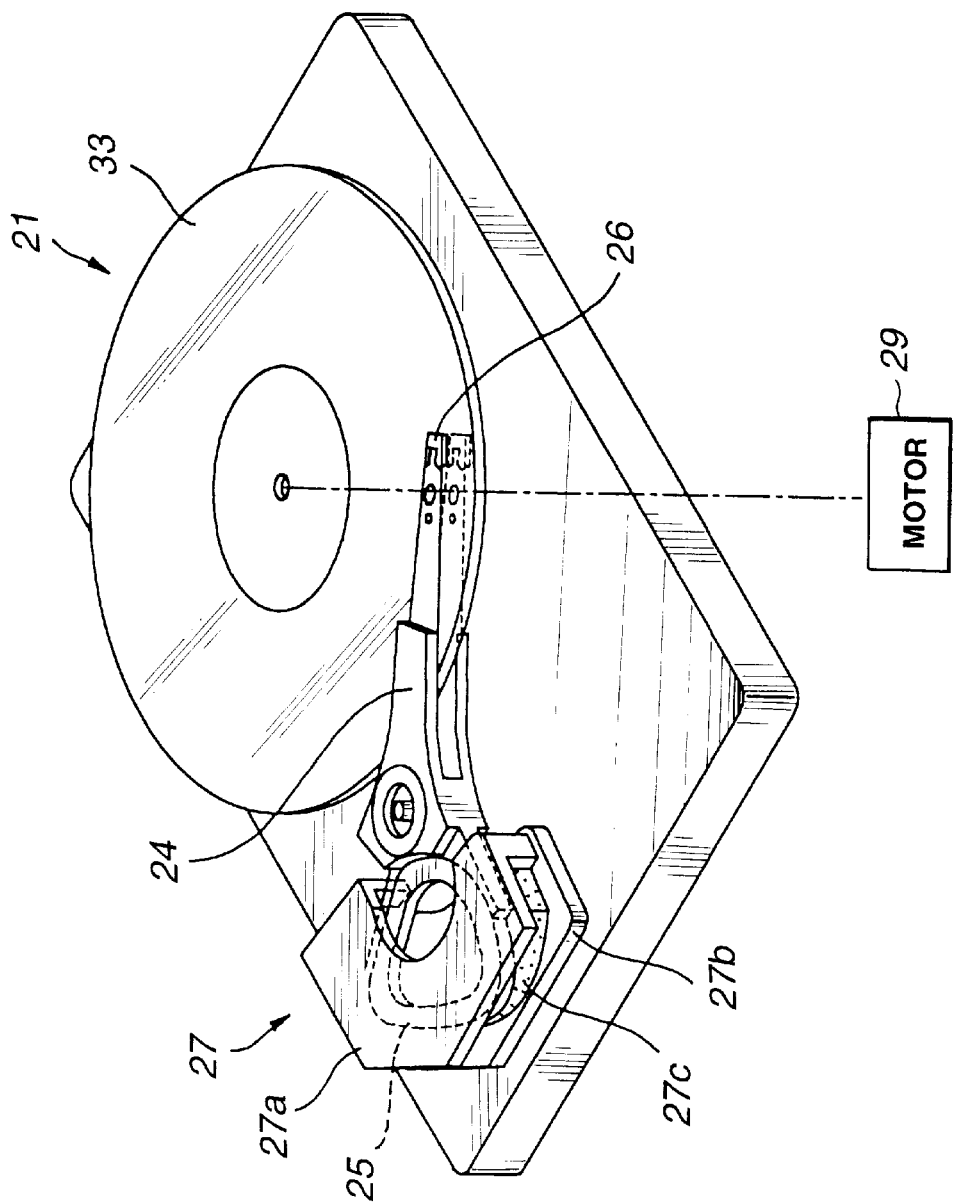
FIG. 4 is a schematic perspective view showing an example of a magnetic disc apparatus using floating head.

FIG. 4 is a schematic perspective view showing an example of the magnetic disc unit.

This magnetic disc unit 21 is adapted so that a spindle motor 29 is disposed at the back side of the plane portion of a casing 22 formed by aluminum alloy, etc., and comprises a magnetic disc 23 rotationally driven at, e.g., constant angular velocity by this spindle motor 29.

Further, at this casing 22, an arm 24 is rotatably attached with a vertical shaft 24a being as the rotational shaft. A voice coil motor 27 is attached to one end of this arm 24, and a head slider 26 is attached to the other end of this arm 24.

The voice coil motor 27 is composed of a cover yoke 27a, a bottom yoke 27b, a voice coil 25, and a magnet 27c. The cover yoke 27a and the bottom yoke 27b are disposed in such a manner that the voice coil 25 and the magnet 27c are put therebetween, and the magnet 27c is attached on the bottom yoke 27b.

In the magnetic disc unit constituted in this way, when the spindle motor 29 is driven, the magnetic disc 23 is rotated at constant angular velocity. When current is delivered from the external to the voice coil 25, the arm 24 is rotated with the vertical shaft 24a being as the center of rotation on the basis of force produced by magnetic field of the magnet 27c and current flowing in the voice coil 25. Thus, the head slider 26 attached to the other end of the arm 24 is moved substantially in the radial direction of the magnetic disc 23 while traveling on its surface followed by rotation of the magnetic disc 23 so that the so-called seek operation is carried out.

The head slider 26 is adapted so that rails are formed along both side edges of the surface opposite to the magnetic disc 23. Thus, the head slider 26 is caused to float by air flow flowing in the gap between these rails followed by rotation of the magnetic disc 23.

This invention will now be described in more practical sense by taking embodiments and comparative example, but this invention is not limited to these embodiments. In addition, in the resin preparation example, the embodiments and the comparative examples which will be described below, part and % are weight reference as long as notice is particularly not made.

Resin Preparation Example 1

Ring opening polymer 100 part synthesized from monomer including 6-methyl-1,4:5,8-dimethano-1,4,4a,5,6,7,8, 8a-ocatahydronaphthalene (hereinafter referred to as MTD) 90% and 5-methyl-2-norbornene 10% was dissolved into cyclohexane 400 part to add nickel-alumina catalyzer (Nikki Kagaku Co.) as hydrogenation catalyzer to raise its pressure by hydrogen so that it is equal to 50 kg/cm$^2$ to elevate temperature so that it is equal to 200° C. while agitating it thereafter to allow article to react for four (4) hours to synthesize ring opening polymerized hydride polymer.

Reaction liquid of polymer content of 20% including non-uniform hydrogen catalyzer was pressure-filtrated at pressure of 2.5 kg/cm$^2$ by using pressure-filter (Funda Filter, Ishikawazima Harima Juko Co.) with Radiolite #500 being as filtering bed. Thus, transparent solution (solution I) was obtained.

Solution I100 part was further filtrated by filter of metal fiber (aperture 3 $\mu$m, Nichidai Co.) and filter of metal fiber (aperture 0.2 $\mu$m, Nichidai Co.) to remove foreign material. Thus, solution II was obtained. The solution II was used to remove cyclohexane which is the volatile component under the working (operation) condition of the first step: temperature 270° C. and pressure 100 Torr and the second step: temperature 270° C. and pressure 5 Torr by the cylindrical condensed dryer (Hitachi Seishakusho). Polymer in molten state is thrust out from the die within clean room of class 1000 to cool it by water thereafter to carry out cutting thereof by pelletizer (OSP-2, Nagata Seisakusho). Thus, pellet 18 part (polymer A) was obtained. The polymer A was filled into the sealing vessel of stainless steal of which surface has been polished, and was stored therewithin. As the result of the fact that toluene solution of polymer A 10% is analyzed by gaschromatography, the remaining cyclohexane quantity was measurement limit or less. The polymer A was transparent, polystyrene converted molecular weight by the GPC analysis was Mn:27,000 and Mw:56,000, and Tg measured by the DSC analysis was 140° C. Further, as dichloroform solution, hydrogen addition percentage measured by the $^1$H-NMR spectrum was substantially 100%. Then, solution of 1.5% concentration was prepared by using toluene in which polymer A is filtrated and refined by 0.2 μm cartridge filter to measure the number of foreign particles (materials) having particle diameter of 0.5 μm or more by using the light scattering type micro particle detector (KS-58, Ryon Co. Ltd.). As a result, the number of foreign particles was 6.2×10$^3$/g.

Resin Preparation Example 2

The solution I100 part obtained in the resin preparation example 1 was filtrated twice by filter having aperture of 3 μm and filter of aperture of 0.2 μm which are similar to those used in the resin preparation example 1 to remove foreign material. Thus, solution III was obtained. This solution III was used to remove the volatile component in a manner similar to the resin preparation example 1. Thus, pellet 18 part (polymer B) was obtained. Similarly to the resin preparation example 1, the polymer B was filled into the sealing vessel of stainless steal and was stored therewithin. The polymer B is transparent. As the result of the fact that analysis thereof is conducted in a manner similar to the resin preparation example 1, the remaining cyclohexane quantity is measurement limit or less, molecular weight was Mn:27,000 and Mw:56,000, Tg was 140° C., and the number of foreign particles (materials) having particle diameter of 0.5 μm or more was 3.0×10$^3$/g.

Resin Preparation Example 3

The solution I100 part obtained in the resin preparation example 1 was filtrated by filter of aperture of 3 μm which is similar to that used in the resin preparation example 1 thereafter to filtrate it by ζ (zeta) plus filter 30S (aperture 0.5 to 1 μm, Cuno Co.) to further filtrate it by filter of aperture of 0.2 μm which is similar to that used in the resin preparation example 1 to remove foreign material. Thus, solution IV was obtained. This solution IV was used to remove the volatile component in a manner similar to the resin preparation example 1. Thus, pellet 18 part (polymer C) was obtained. Similarly to the resin preparation example 2, the polymer C was filled into the sealing vessel of stainless steal and was stored therewithin. The polymer C was transparent. As the result of the fact that analysis thereof was conducted in a manner similar to the resin preparation example 1, the remaining cyclohexane quantity was measurement limit or less, molecular weight was Mn:27,000 and Mw:56,000, Tg was 140° C., and the number of foreign particles (materials) having particle diameter of 0.5 μm or more was 2.1×10$^3$/g.

Resin Preparation Example 4

Pellet 18 part (polymer D) was obtained similarly to the resin preparation example 1 except that polymer is filled into paper bag containing inner bag of polystyrene and is stored therewithin in place of the sealing vessel of stainless steel. As the result of the fact that analysis is conducted similarly to the resin preparation example 1, the remaining cyclohexane quantity was measurement limit or less, the molecular weight was Mn:27,000 and Mw:56,000, Tg was 140° C., and the number of foreign particles (materials) having particle diameter of 0.5 μm or more was 2.7×10$^4$/g.

Embodiment 1

The polymer A obtained in the resin preparation example 1 was used to allow stamper of Ni having smooth surface (Ra, 1 nm) to be loaded within the metal mold under the condition of resin temperature of 320° C. and the metal mold temperature of 120° C. by the injection molder (DISK3, Sumitomo Jukikai Kogyo Co.) installed within the clean room having degree of cleanness of class 1000 and in which the metal mold portion is maintained by the clean booth so that there results the environment having degree of cleanness of class 100 to carry out molding of a magnetic disc substrate having diameter 65 mm and thickness of 1.2 mm.

Surface roughness Ra and presence/absence of projections having 50 nm or more were examined with respect to the twenty (20) smooth magnetic disc substrates thus obtained. With respect to the surface roughness, the area of 50 μm×50 μm of the surface of the magnetic disc substrate was scanned by contact needle to sample, by the area of 20 μm×20 μm, the area where there does not exist projection equivalent to the floating quantity of the floating slider or more to determine arithmetic average roughness Ra in that area. Namely, the surface roughness represents roughness of the surface except for projection when viewed from a strict point of view.

The center line average roughness Ra was 1.0 to 1.1 nm. This value was substantially close to the surface roughness of the stamper. Moreover, nine (9) magnetic disc substrates having no projection were obtained among 20 substrates. Presence/absence of projection is determined by controlling the number of disc rotations so that the slider is caused to float in the state of floating quantity of 50 nm to carry out detection from acceleration signal at the time of collision by the piezo element attached at the slider. Materials of 1.5 g are respectively cut from two magnetic disc substrates among them to allow them to be toluene solution similarly to the resin preparation example 1 to measure the number of foreign particles (materials) having particle diameter of 0.5 μm or more. As a result, their numbers of foreign particles were 6.3×10$^3$ and 6.5×10$^3$/g.

Embodiment 2

The polymer B obtained in the resin preparation example 2 was used to carry out molding of magnetic disc substrate in a manner similar to the embodiment 1. As the result of the fact that surface roughness Ra and presence/absence of projection having height of 50 nm or more were examined with respect to twenty (20) smooth magnetic disc substrates thus obtained similarly to the above-mentioned embodiment 1, Ra was 1.0 to 1.1 nm. This value was substantially close to the surface roughness of the stamper. Moreover, thirteen (13) magetic disc substrates having no projection were obtained among the twenty (20) substrates. As the result of the fact that the number of foreign particles (materials) having particle diameter of 0.5 μm or more was measured in a manner similar to the embodiment 1 from two of these magnetic disc substrates, their values were 3.0×10$^3$/g and 3.2×10$^3$/g.

Embodiment 3

The polymer C obtained in the resin preparation example 3 was used to carry out molding of magnetic disc substrate similarly to the embodiment 1. As the result of the fact that surface roughness Ra and presence/absence of projection having height 50 nm or more were examined with respect to twenty (20) smooth magnetic disc substrates thus obtained similarly to the embodiment 1, Ra was 1.0 to 1.1 nm. This value was substantially close to the surface roughness of the stamper. Moreover, fifteen magnetic disc substrates having no projection were obtained among twenty (20) substrates. As the result of the fact that the number of foreign particles (materials) having particle diameter 0.5 μm or more was measured similarly to the embodiment 1 from two of these magnetic disc substrates, their values were 2.3×10$^3$/g and 2.6×10$^3$.

Comparative Example 1

The polymer D obtained in the resin preparation example 4 was used to carry out molding of magnetic disc substrate similarly to the embodiment 1. As the result of the fact that surface roughness Ra and presence/absence of projection having height 50 nm or more were examined with respect to the twenty (20) smooth magnetic disc substrates thus obtained, Ra was 1.0 to 1.1 nm. This value was substantially close to the surface roughness of the stamper. However, any magnetic disc having no projection cannot be obtained among these twenty (20) magnetic disc substrates. As the result of the fact that two magnetic disc substrates having projection are selected to measure the number of foreign particles (materials) having particle diameter of 0.5 μm or more similarly to the embodiment 1, their numbers of foreign particles were both $2.7 \times 10^4$/g.

Figure 5:
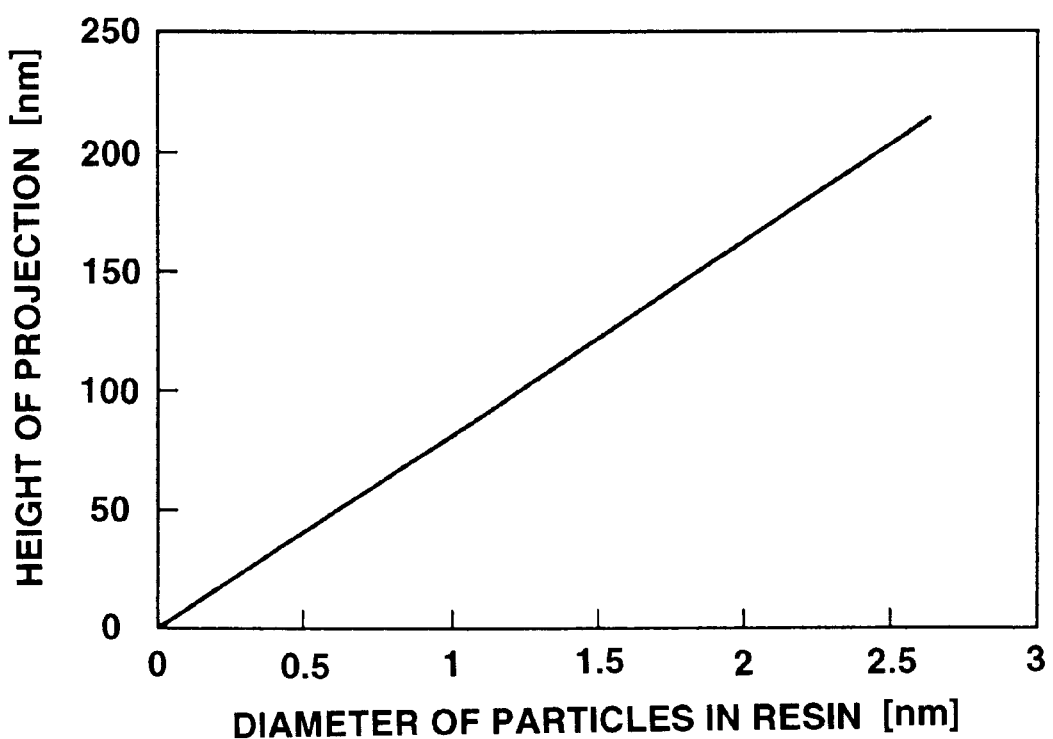
FIG. 5 is a characteristic diagram showing the relationship between particle diameter of foreign particles and projection height.

The periphery of the projected portion was cut and removed with respect to the magnetic disc substrate obtained in the above-mentioned comparative example 1 to measure height of projection and diameter of particles existing below the projection by the microscope. The measurement result was shown in FIG. 5. From this result, it is estimated that particles having particle diameter of 0.5 μm or more cause projection having height of 50 nm or more.

Embodiment 4

Figure 6:
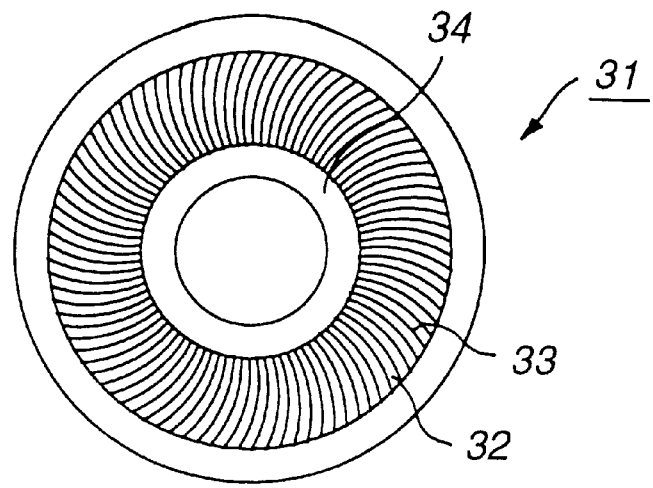
FIG. 6 is a schematic plan view showing an example of magnetic disc substrate on which uneven portions are formed.

Magnetic disc substrate on which uneven portions are formed was shown in FIG. 6. In more practical sense, a portion 32 where the data area is to be formed and a portion 33 where the servo mark is to be formed exist below the slider movement range of a magnetic disc substrate 31. The portion where the magnetic disc substrate 31 is attached to the unit (apparatus) serves as a clamping portion 34.

The portion 32 where the data area is to be formed serves as the portion where data are actually recorded. On the other hand, the portion 33 where the servo mark is to be formed serves as the portion where information for controlling (tracking) addresses and positions within the recording tracks are pre-formatted.

Figure 7:
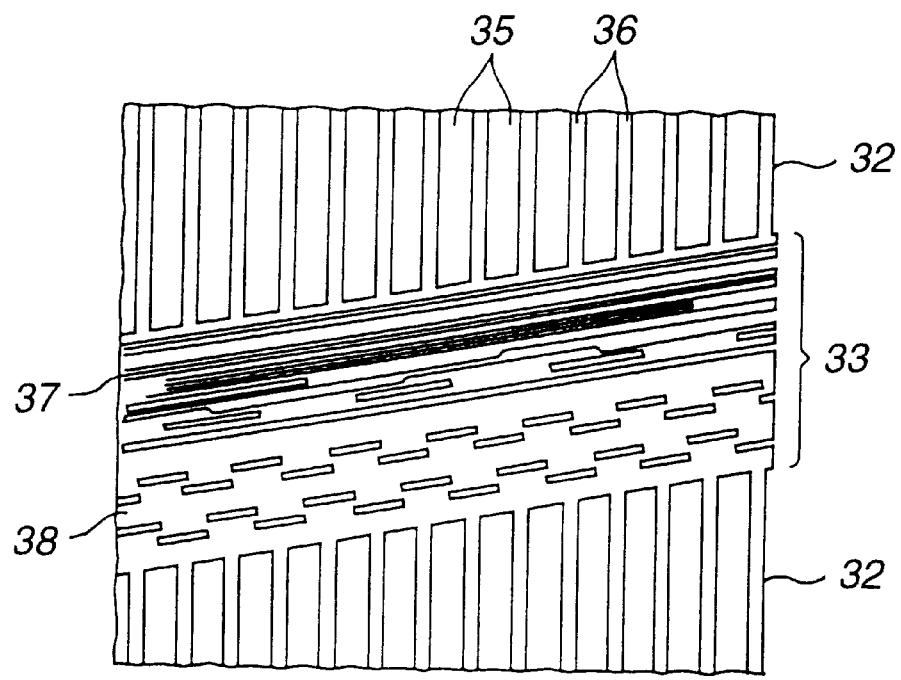
FIG. 7 is a schematic plan view showing, in an extended manner, the portion where data area is to be formed and the portion where servo mark is to be formed.

Enlarged view of the portion 32 where the data area is to be formed and the portion 33 where the servo mark is to be formed is shown in FIG. 7.

The portion 32 where the data area is to be formed is composed of convex shaped portions 35 where recording tracks are to be formed and concave shaped portions 36 where the guard bands are to be formed. The portion 33 where the servo mark is to be formed is formed of several kinds of uneven portions such as a portion 37 where address mark is to be formed and/or a portion 38 where fine mark is to be formed, etc.

The polymer C obtained in the resin preparation example 3 was used to allow a stamper of Ni formed as pattern in which uneven portions of the portion where the servo mark is to be formed and the portion where the data area is to be formed are inverted to be loaded within the metal mold under the molding condition similar to the embodiment 1 thus to carry out molding of magnetic disc substrate. The center line average roughness Ra of the recessed portion of the stamper is 1 nm, and difference between height of the concave portion and that of the convex portion is 200 nm.

With respect to the twenty (20) magnetic disc substrates obtained by molding, surface roughness Ra, heights of the concave portion and the convex portion and presence/absence of projections having height of 50 nm or more were examined.

As a result, the center line average roughness Ra of the convex portion was 1.0 to 1.2 nm. Thus, surface roughness substantially equivalent to that of the stamper was obtained. Difference between height of the concave portion and that of the convex portion was 185 to 195 nm.

Moreover, as the result of the fact that the number of rotations of the disc is adjusted so that the floating quantity of the slider becomes equal to 50 nm to carry out detection of projection, thirteen (13) magnetic disc substrates having no projection were obtained among twenty (20) magnetic disc substrates.

As the result of the fact that the number of foreign particles (materials) having particle diameter of 0.5 μm or more was measured in a manner similar to the embodiment 1 with respect to two of these magnetic disc substrates, their numbers of foreign particles were $2.5 \times 10^3$/g and $2.2 \times 10^3$/g.

Embodiment 5

Sputtering was carried out in order of Cr/CoPtCr/Cr/CoPtCr/C with respect to the smooth magnetic disc substrate obtained in the embodiment 3 to form recording film of total film thickness of 80 nm.

The overwrite characteristic when recording is carried out at frequency of 2.374 MHz thereafter to carry out recording/reproduction at frequency 11.87 MHz was measured.

With respect to the magnetic head used, inductive head having track width of 3.5 μm was used as the recording head, and MR head having track width of 2.5 μm was used as the reproduction head. The linear velocity at the time of recording/reproduction is 7.36 m/sec.

As a result, 38 dB above 25 dB which is the value of S/N necessary for constructing the system was obtained.

Embodiment 6

Magnetic film of $Co_{80}Pt_{20}$ (atomic %) having film thickness of 36 nm was sputtered with respect to magnetic disc substrate adapted so that uneven portions are formed at the portion where the servo mark is to be formed and the portion where the data area is to be formed, which was obtained in the embodiment 4, to carry out recording at 1 MHz with respect to the entire surfaces of the uneven portions of the portion where the data area is to be formed to measure the overwrite characteristic when recording is carried out with respect to the portion where recording tracks are to be formed, which are convex portions, at 7 MHz.

With respect to the magnetic head used, inductive head having track width of 3.5 μm was used as the recording head, and MR head having track width of 2.5 μm was used as the reproduction head. The linear velocity at the time of recording/reproduction is 7.0 m/sec.

As a result, 31.3 dB above 25 dB which is the value of S/N necessary for constructing the system was obtained.

We claim:

1. A substrate for disc medium for use in a recording and/or reproduction system employing a floating head, comprising:
   a molded thermoplastic disc medium substrate including a floating head scanning surface defined thereon having a surface smoothness such that projections having height of 50 nm or more are not formed at least on the floating head scanning surface of the disc medium substrate where the floating head scans.

2. A substrate for disc medium as set forth in claim 1, wherein the disc medium substrate is molded by injection-molding resin.

3. A substrate for disc medium as set forth in claim 2, wherein the resin is thermoplastic norbornene resin.

4. A substrate for disc medium as set forth in claims 3, wherein uneven portions corresponding to recording tracks are provided at least on one principal surface.

5. A method of manufacturing a substrate for disc medium wherein, in molding resin so as to take shape of substrate for disc medium, control is conducted such that the number of particles of foreign matter having particle diameter of 0.5 μm or more within molded body is 10000/g or less to carry out molding.

6. A method of manufacturing a substrate for disc medium as set forth in claim 5, wherein the molding is injection molding.

7. A method of manufacturing a substrate for disc medium as set forth in claim 6, wherein the resin is thermoplastic norbornene resin.

8. A substrate for disc medium of resin used as a disc medium adapted so that recording and/or reproduction are carried out by a floating head, wherein the disc medium substrate is molded under a condition such that the number of particles of foreign matter having particle diameter of 0.5 μm or more is 10000/g or less.

9. A substrate for disc medium as set forth in claim 8, wherein the disc medium substrate is molded by injection-molding resin.

10. A substrate for disc medium as set forth in claim 9, wherein the resin is thermoplastic norbornene resin.

11. A disc apparatus provided with a disc using a substrate for disc medium of resin adapted so that recording and/or reproduction are carried out by a floating head and projection having height of 50 nm or more is not formed on the surface of the disc medium where the magnetic head scans.

12. A disc apparatus as set forth in claim 11, wherein the disc medium substrate is a substrate for disc medium molded by conducting a control such that the number of particles of foreign matter having particle diameter of 0.5 μm or more is 10000/g or less.

13. A disc apparatus as set forth in claim 12, wherein the disc medium substrate is molded by injection-molding resin.

14. A disc apparatus as set forth in claim 13, wherein the resin is thermoplastic norbornene resin.

* * * * *